July 8, 1924.

F. V. WIDGER

REVERSING GEARING

Original Filed Jan. 30, 1922

1,500,697

Witnesses:
W. J. Kilroy
Harry B. L. White.

Inventor:
Frank V. Widger
By Kent W. Worrell Atty.

Patented July 8, 1924.

1,500,697

UNITED STATES PATENT OFFICE.

FRANK V. WIDGER, OF CHICAGO, ILLINOIS.

REVERSING GEARING.

Application filed January 30, 1922, Serial No. 532,558. Renewed December 10, 1923.

*To all whom it may concern:*

Be it known that I, FRANK V. WIDGER, a citizen of the United States, residing at Chicago, in the county of Cook and State of Illinois, have invented certain new and useful Improvements in Reversing Gearing, of which the following is a specification.

This invention relates to a continuously driven automatically reversing gearing, particularly designed and intended for use in connection with washing machines and the like, but of course it may have a more general use wherever applicable. The principal object of the invention is to provide a simple and efficient means for automatically reversing the operation of a driven member after a predetermined movement in one direction. Other objects will appear hereinafter.

Figure 1:
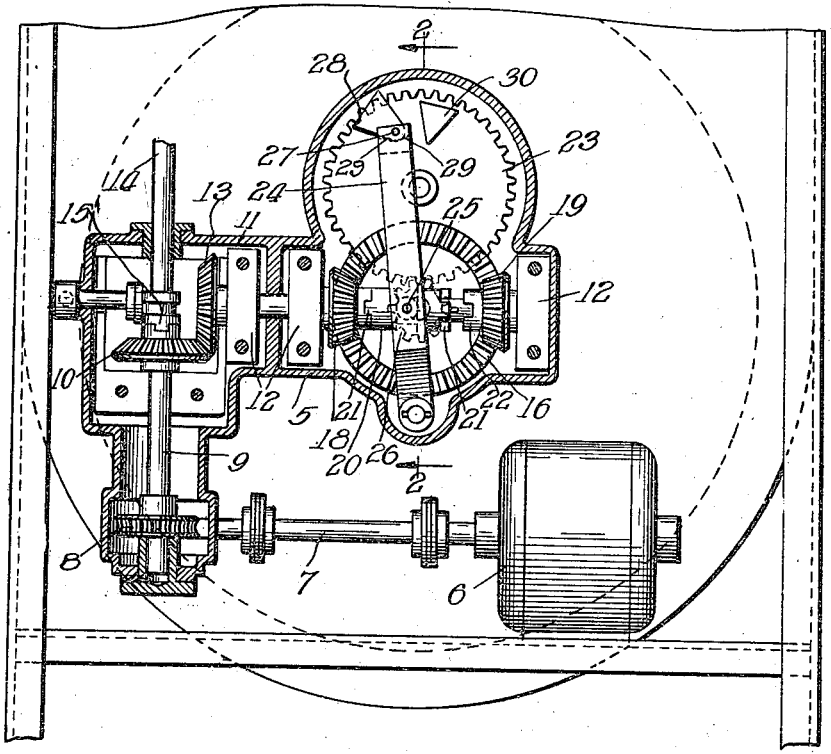
Figure 2:
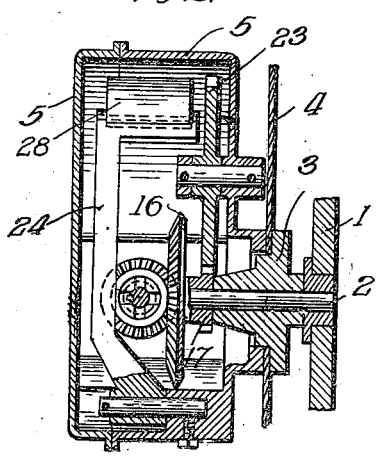
Figure 3:
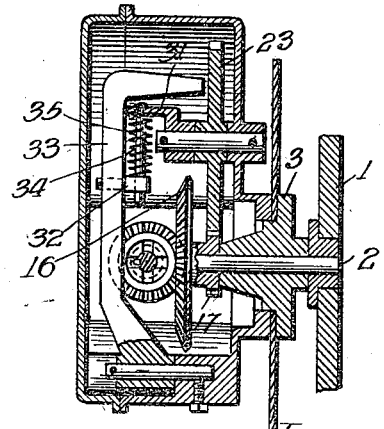

In the accompanying drawings, Fig. 1 is a view of a gearing constructed in accordance with the principles of my invention; Fig. 2 is a section taken on the line 2—2 of Fig. 1; and Fig. 3 illustrates a modification.

In a washing machine it is desirable that an inner cylinder in which the clothes are placed shall make one or more revolutions in one direction and shall then automatically reverse, making one or more revolutions in the opposite direction, continuing as long is it is desired to wash the clothes. The present invention is intended to provide a simple and reliable construction for accomplishing the reversing action.

Referring now more particularly to the drawings, an inner cylinder or receptacle 1 is mounted upon a shaft 2 which rotates in a bearing 3 carried by a housing 4.

At the outside of the housing but preferably supported thereby is an enclosing casing 5 for containing the gearing. A driving motor 6 is connected by means of a shaft 7 and a worm drive connection 8 with a vertical shaft 9 which carries a gear 10. A cross shaft 11 suitably mounted in bearings 12 in the casing has a bevel gear 13 meshing with the bevel gear 10 on the shaft. A wringer driving shaft 14 and a clutch 15 may be provided for driving the wringer from the shaft 9.

Attached to the shaft 2 is a driven bevel gear 16 with a smaller pinion 17 attached thereto or formed integral therewith. Mounted on the shaft 11 and meshing with the bevel gear 16 at opposite sides thereof are bevel pinions 18 and 19 between which a clutch collar 20 is movable upon the shaft 11. This clutch collar has teeth 21 at opposite ends for engaging clutch notches 22 of either one of the pinions 18 or 19, but not both of them at the same time so that the direction of rotation of the gear 16 depends upon which one of the pinions 18 or 19 is connected thereto by the clutch collar which is slidably keyed to the shaft 11.

In order to control the operation of the clutch collar 20, a gear 23 meshes with the pinion 17 carried by the driven bevel gear 16 so that the gear 23 rotates in accordance with the movement of the gear 16. A lever 24 is pivoted below the shaft 11 and carries a projection 25 which engages in a notch 26 of the clutch collar 20. At the upper end of this lever 24 is a transverse pivot pin 27 upon which a weight 28 is mounted. The weight is formed with side faces converging toward the pivot, and the lever is provided with shoulders 29 on opposite sides of the pivot which are adapted to engage and support the weight 28 in an inclined position on one side or the other of the pivot. Extending from the outer face of the gear 23 is a projection 30 adapted to engage the weight and to swing it at the end of its lever.

In operation the gear 23 is driven in one direction by the gear 17 until the projection 30 moves the weight 28 and the lever 24 (reversely) to engage the clutch collar 20 with the other gear 18 or 19. The movement of the clutch collar causes the rotation of the driving gear 16 to be reversed which consequently reverses the rotation of the controlling gear 23. The gear 23 is thereupon rotated in a reverse direction until the projection 30 engages the weight 28 tipping it oppositely on the end of the lever 24 and moving the shaft over so that it disengages the clutch collar 20 from the gear 18 or 19 with which it is then in engagement and causes the clutch collar to engage with the other gear, thereupon reversing the rotation of the gear 16 and 23, whereupon the above action is repeated until the motor is stopped.

The action of the weight 28 causes the disengagement of the clutch collar from one of the gears and its engagement with the other one for as the weight is tipped over past the vertical center line of the pivot 27 by the projection 30 it imparts a jerk or jolt to the lever sufficient to swing the lever over disengaging the clutch collar 30 from one of the gears 18 or 19 and engaging it with the other one.

In Fig. 3 an alternative construction is shown which includes spring mechanism instead of the weight. A projecting arm member 31 is carried by the gear 23 and a rotatable eye member 32 is carried by lever 33 which corresponds to the lever 24. Attached to the arm 31 and extending through the eye member 32 for sliding movement is a rod 34 surrounding which is a spring 35 disposed between the arm and the eye member. The arm is eccentric with respect to the gear 23 so that when the gear is rotated in one direction the arm 31 is carried to one side of the lever 33 turning the eye member 32 in accordance therewith and compressing the spring 35 until it is sufficiently compressed to move the lever and throw out the clutch member 20 from engagement with one of the gears 18 or 19 and into engagement with the other one. This action reverses the rotation of the gear 23 and the arm 31 is then swung around in the opposite direction to rotate the operation above described at the other side of the lever 33 thus causing the continued reversal of the mechanism.

With either one of these constructions the clothes receptacle 1 may be rotated a number of times, or a part of a rotation in one direction before reversal, depending upon the relative sizes of the driving members. It is found preferable to rotate the receptacle a number of times in one direction and then to reverse the rotation for the same number of times in the other direction. Either one of the constructions described may be stopped at any point in their operation by stopping the motor, and when the motor is re-started, they will continue their operation as before. These constructions are unlikely to get out of order and each one is enclosed by the casing 5, the top or cap of which is removable for easy access to any of the working parts.

I claim:

1. In a reversing gear mechanism, a lever pivoted at its lower end and disposed uprightly, a double throw clutch operated by the lever limiting the movement thereof in both directions from its vertical position, a weight pivoted at the upper end of the lever, and rotatable means for directly engaging and throwing the weight at one side of the lever or the other to cause its clutch reversing movement.

2. In reversing mechanism, a continuous driving shaft, a reversible gear, means for connecting the gear to the shaft for operating the gear in reverse direction, a pivoted operating lever for said means, a weight independently pivoted at the end of the lever operable to throw and hold the lever at one side of a vertical position, and means on the gear for engaging the weight to throw the lever in the other direction.

3. The combination with a driving shaft, of a reversible gear, pinions mounted on the shaft engaging the opposite sides of the gear, a clutch to connect either one of the pinions to the shaft, a lever movable to either side of a vertical position for engaging the clutch with one or the other but not both of the pinions at the same time, a gear driven by the reversible gear, a weight pivoted at the upper end of the lever, and a projection on the last named gear for engaging the weight at one side of the lever to throw it over the vertical center and move the lever in the same direction.

4. In a reversing mechanism of the class described, a lever movable to either side of a vertical position for reversing the movement, a weight pivoted at the upper end of the lever for holding it at either side of a vertical position, rotatable means for derectly engaging the weight to reverse the position of the lever, and a shouldered portion at the end of the lever engaged by the weight at either side thereof to limit the rotation of the weight with respect to the lever.

FRANK V. WIDGER.